(No Model.) 2 Sheets—Sheet 2.
A. L. BRYAN.
ANIMAL TRAP.
No. 305,664. Patented Sept. 23, 1884.
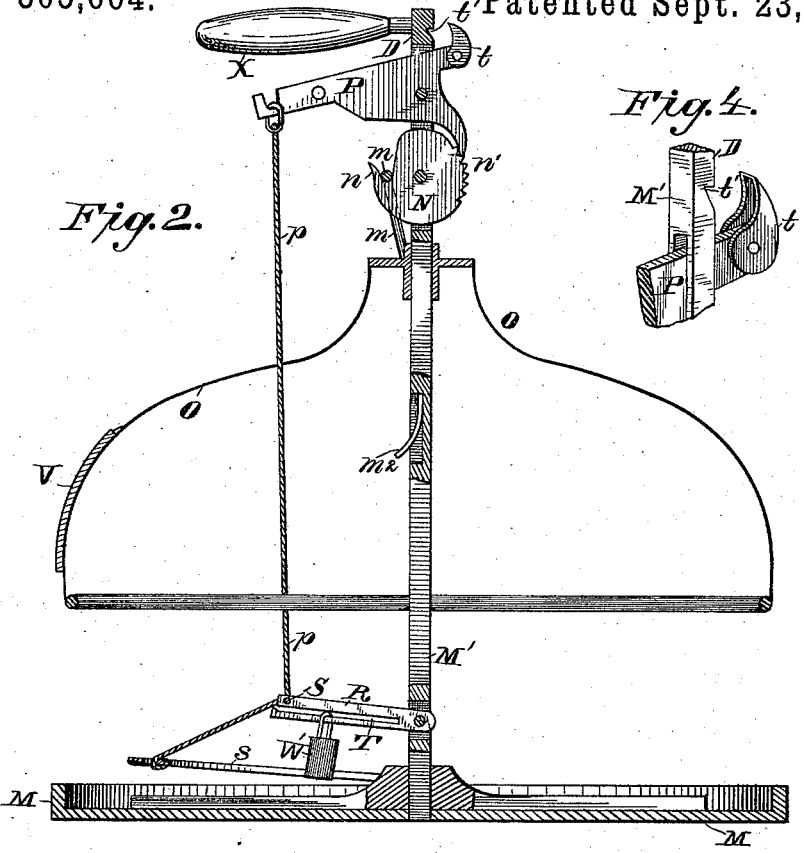
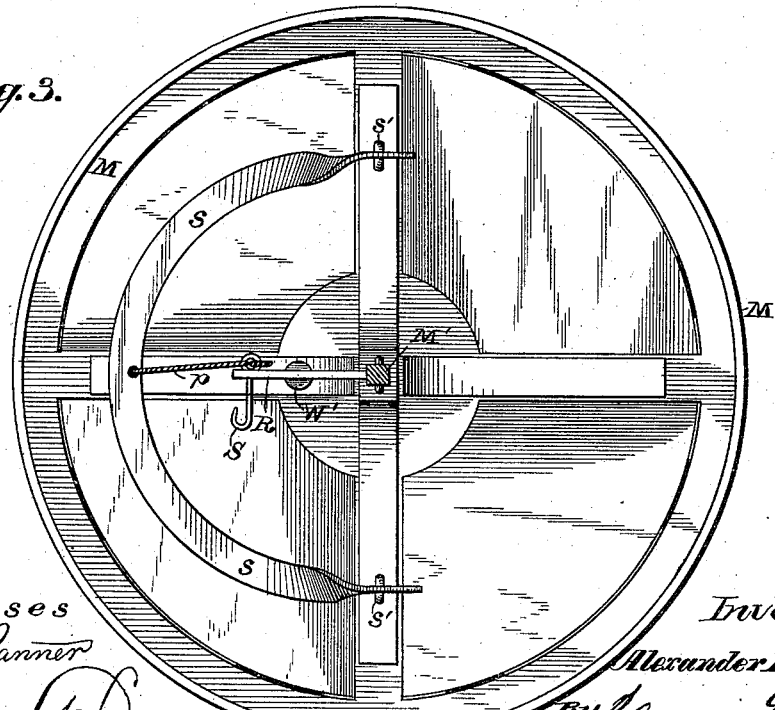
Witnesses
Inventor
Alexander L. Bryan
By James L. Norris
Attorney

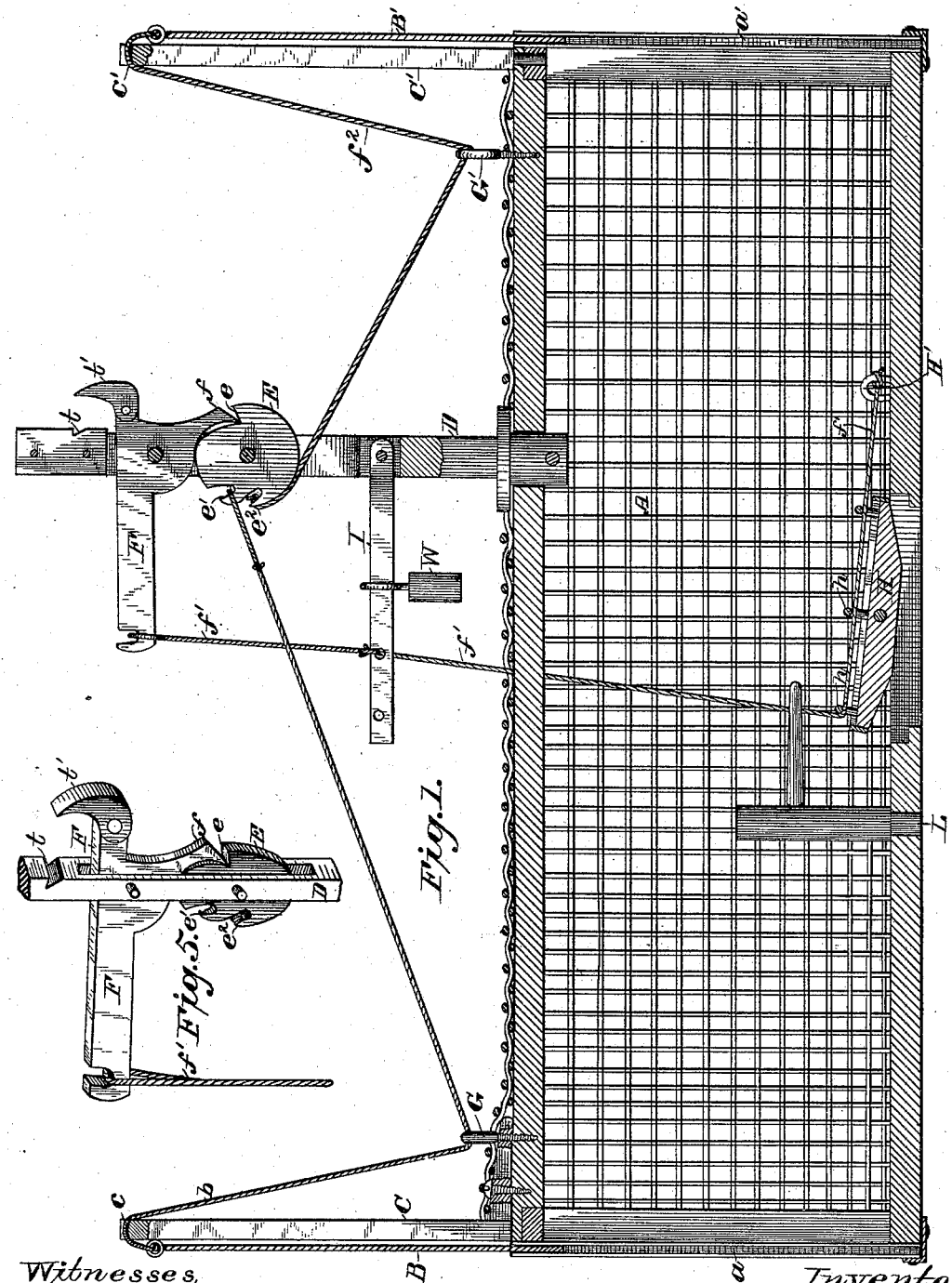

UNITED STATES PATENT OFFICE.

ALEXANDER L. BRYAN, OF EDGEWOOD, GEORGIA.

ANIMAL-TRAP.

SPECIFICATION forming part of Letters Patent No. 305,664, dated September 23, 1884.

Application filed December 26, 1883. (No model.)

*To all whom it may concern:*

Be it known that I, ALEXANDER L. BRYAN, a citizen of the United States, residing at Edgewood, in the county of De Kalb and State of Georgia, have invented new and useful Improvements in Animal-Traps, of which the following is a specification.

My invention relates to animal-traps, and has for its object to provide simple and efficient means for operating a falling trapping device, which is set free either by the weight of the animal or by his tampering with the bait, and to combine therewith means for rendering the trigger more or less sensitive, as the weight of the animal caught or other circumstances may require.

To this end, therefore, my invention consists in the several novel features of construction and combinations of parts, hereinafter described, and pointed out in the claims.

Referring to the drawings, Figure 1 is a central vertical section taken from end to end of a trap embodying my invention. Fig. 2 is a similar section illustrating a modified form of my invention. Fig. 3 is a plan view of the base portion shown in Fig. 2. Fig. 4 is a detail of the locking device for securing the trigger after the trap is set, in order that it may be removed from place to place without springing it. Fig. 5 is a detail perspective of part of the tripping mechanism.

In said drawings, the letter A designates the body of a trap of any suitable form, and provided with a vertically-sliding drop or door, B, at either end, or, if desired, at both ends. These doors may be made of sheet metal, or of other material, and are arranged to slide in guideways $a$ $a$, their weight being such as to insure their immediate descent when the trigger is operated. Upon the top of the trap, and immediately in front of the door, is placed an upright, C, having an eye or notch, $c$, in its end, through which is led a cord, $b$, having one end attached to the top of the door B. A friction-roll may, if required, be journaled in the upright; but for all ordinary purposes the construction shown will prove sufficient. Upon the top of the trap, and at a convenient point between its ends, is placed a standard, D, and upon a horizontal axis therein is mounted a disk, E, having a notch, $e$. Above said disk is arranged a trigger, F, having a toe, $f$, which is adapted to engage with the notch $e$. Upon the side of the disk E opposite this notch are formed hooks or catches $e'$ $e^2$, and the gate-cord $b$, which is led from the eye $c$ of the upright C, through a staple or loop, G, below, passes thence to the hook or catch $e'$, with which it engages by means of a loop formed upon the end of the cord, or a ring attached thereto. It will be seen that when the trap is set the trigger F will hold the disk E against rotation, and thereby sustain the weight of the door as long as the trigger is in engagement with the notch $e'$ in the disk. To the end of the trigger F is attached a tripping-cord, $f'$, which drops vertically through the roof of the cage to an elevated floor-section, H, pivoted centrally to the floor of the cage. Near its central portion are placed staples $h$ $h$, through which the cord $f'$ passes, its end being secured to a staple, H', in the floor. Between the tripping lever or trigger F and the roof of the cage is placed an ordinary arm, I, pivoted to the standard D, and to this arm the tripping-cord $f'$ is attached.

W indicates a weight, which is adjustable upon said arm toward and from its pivotal point.

In front of the pivoted floor-section H is placed a bait-post, L, of any suitable construction—such, for example, as that shown—upon which the bait may be impaled.

The operation of the parts described is as follows: The bait being properly arranged, the trap is set by raising the door, carrying the cord $f'$ through the loop or staple G, hooking its end over the catch $e'$, and engaging the notch $e$ with the trigger F. The animal being attracted by the bait enters the cage, and in disengaging it from the post L thereby causes sufficient tension of the cord $f'$ to trip the trigger F and drop the door B. By adjusting the weight W upon the arm I the tripping mechanism may be made more sensitive, so that a small weight upon the pivoted section H will operate it. When a door is used upon both ends of the trap, the cord $f^2$, supporting the second door, is passed from its loop G' beneath the disk E and connected with the hook $e^2$, in the manner shown in Figs. 1 and 5. A convenient manner of making this connection is to notch the point of the hook $e^2$, and knot the end of the cord which lies in the notch, the knot being too large to pass through. In this manner both doors may be operated by the same tripping device.

A modified form of device is shown in Fig. 2, wherein I propose to support the whole body of the trap upon a central standard. In said figure the letter M designates the base of the trap, from which rises a central upright, M'. Near the top of the latter is pivoted a disk, N, having a hook, n, formed in its edge, and a series of notches, n'. Upon the top of the trap drop or body O is a loop, m, which engages with the notch n', and above the disk N is pivoted a trigger, P, having a toe which engages with any one of the notches n' and holds the trap-body suspended above its base. To the end of the trigger P is attached a tripping-cord, p, passing down through the roof of the cage and attached to an arm, R, pivoted to the upright M', a little above its base. Upon this arm is mounted a bait hook or holder, S, and surrounding the same, but arranged nearer the base, is a plate or strip, s, having its ends supported upon pivots s'. The cord p is carried from the arm R to the central point of this strip and fastened thereto. In securing the bait the animal is almost sure to step upon this strip, and thereby trip the trigger and drop the cage. The same result also attends tampering with the bait. By splitting the arm R, I provide a scale-beam, T, upon which a weight, W', may be adjusted, whereby the weight necessary to trip the trigger P may be regulated.

As it is frequently desirable to set the trap and then locate it, I provide a locking device by which the trigger may be secured until the trap is placed and adjusted. This device consists of a pawl, t, mounted on the heel of the trigger and engaging with notches t' in the upright. When the trap is placed, this pawl is turned back out of engagement.

In the modified form of construction shown in Fig. 2 I place in the standard M' a spring, $m^2$, which allows the trap to pass downward, but springs outward after it has passed, and prevents it being lifted. A door, V, may also be placed in the side of the trap.

For convenience in transporting the trap a handle, X, of any convenient form, may be applied to the upper end of the standard D.

Having thus described my invention, what I claim is—

1. In an animal-trap, the combination, with a drop falling by gravity, of means for sustaining said drop, a trigger releasing the same, a tripping-cord connected with the trigger and with a pivoted arm having an adjustable weight, substantially as described.

2. The combination, with a drop falling by gravity, of a sustaining-cord, a disk having hooks engaging with said cord, a trigger engaging with a notch in the disk, and mechanism for tripping the same, said trigger being provided with a locking-pawl upon its heel and engaging with the notched standard, substantially as described.

3. The combination, with the tripping-lever, the pivoted foot-plate, the cord connecting the said lever and plate, the notched disk, and means connecting it with a drop, of an intermediate lever-arm connected with said cord and having an adjustable weight, substantially as described.

4. The combination, with the tripping-lever, the notched disk, the drop, and means for connecting it with the disk, of the pivoted lever-arm carrying the bait-holder, the pivoted foot-plate, and the cord connecting the tripping-lever, the lever-arm, and foot-plate, substantially as described.

5. The combination of the base M, the upright M', the notched disk N, the trigger P, pivoted arm R, the cord connecting said arm and trigger, the drop, and the spring $m^2$, substantially as described.

6. The combination, with the standard M', the drop and tripping mechanism, of the pivoted lever-arm R, split to form a scale-beam, T, and the adjustable weight W', substantially as described.

In testimony whereof I have hereunto set my hand in the presence of two subscribing witnesses.

ALEXANDER L. BRYAN.

Witnesses:
H. C. JONES,
JOHN B. STEWARD.